March 2, 1926.  L. POETON  1,575,278
OPHTHALMIC MOUNTING
Filed August 7, 1924
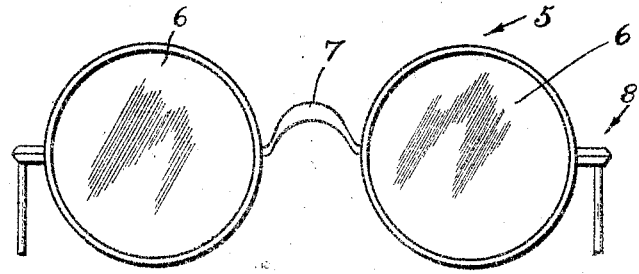
FIG I
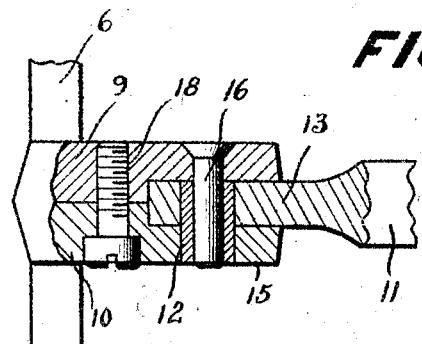
FIG II
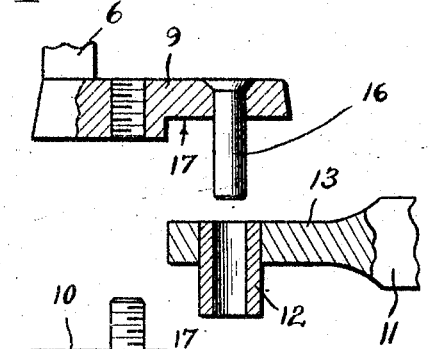
FIG III
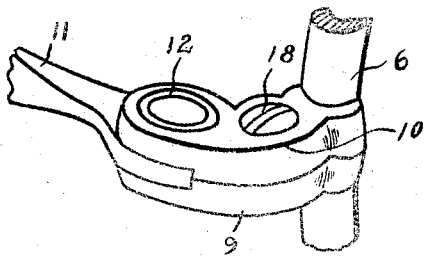
FIG IV
INVENTOR
LAWRENCE POETON
BY
Harry H. Still.
ATTORNEY Patented Mar. 2, 1926.

1,575,278

UNITED STATES PATENT OFFICE.

LAWRENCE POETON, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

OPHTHALMIC MOUNTING.

Application filed August 7, 1924. Serial No. 730,560.

*To all whom it may concern:*

Be it known that I, LAWRENCE POETON, a citizen of the United States, residing at Southbridge, in the county of Worcester and State of Massachusetts, have invented certain new and useful Improvements in Ophthalmic Mountings, of which the following is a specification.

The present invention relates to an end piece for ophthalmic mountings, and has particular reference to an end piece having an exceptionally large bearing surface between the temple and the said end piece.

An important object of this invention is to provide an end piece for opthalmic mountings wherein the bearing surface between the temple and said end piece has been increased so as to guard against a loose fit between the said temple and end piece.

Another very important object of the invention is to provide an end piece for ophthalmic mountings so constructed that the bearing surface between the temple and end piece is so increased that the joint between the two will not wear out so as to cause a loose fit with resultant incorrect positioning of the lenses before the eyes of the user.

Other objects and advantages of the invention will become apparent during the course of the following description.

In the drawings, wherein like numerals are employed to designate like parts throughout the same:

Figure I is a front elevation of an ophthalmic mounting;

Figure II is a fragmentary section through the end piece and temple thereof;

Figure III is a similar view showing the parts before assembly; and

Figure IV is a perspective view of the end piece and temple.

In the drawings, wherein for the purposes of illustration is shown the preferred embodiment of the invention, the numeral 5 designates an ophthalic mounting comprising the eyes 6, bridge 7, and end pieces 8. The end pieces comprise the sections 9 and 10 carried by the respective ends of the eye wire, while forming the eyes 6. The temple 11 is adapted to be hingedly associated with the end piece in such a manner that the temples may be swung into an inoperative position when not in use. The temple 11 is provided with a tubular member 12 which is fixedly mounted in the reduced portion 13 of the said temple. The tube 12 may be secured to the portion 13 in any desired manner, such as by swaging, pressing, brazing, soldering, or the like. The tubular portion 12 is adapted to be passed through an aperture 14 formed in the end piece section 10 and to fall flush with the outer edge 15 thereof. The section 9 of the end piece is adapted to carry the pivot pin 16, which is likewise securely fastened to its carrying member. The pin 16 is adapted to be passed through the bore in the tube 12 in such a manner that the tube 12 is adapted to be pivoted around the post 16. The end piece sections 9 and 10 are cut out as at 17 sufficiently to accommodate the reduced end 13 of the temple 11. After the tube portion 12 has been securely fastened to the portion 13 of the temple 11 and the pin 16 has been associated with the end piece section 9, the tube 12 is passed through the opening 14, and the pin 16 is placed within the bore of the said tube in a manner as is clearly shown in Figure II of the drawings. To prevent separation of the parts after they have thus been arranged, the screw 18 is screw-threadedly passed through both sections 9 and 10 of the end piece.

The temple 11 is thus hingedly associated with the end piece in such a manner that it is braced both longitudinally and vertically to prevent a sloppy fit between the two parts when in use. Due to the enlarged bearing surface the end piece will last much longer, and due to the fact that the tube 12 is received within the end piece section 10 it is almost impossible to move the temple up and down although, of course, the temple is adapted to be swung in a longitudinal plane into an inoperative position.

It is to be understood that the form of the invention herewith shown and described is to be taken as the preferred embodiment of the same and that various changes in the size, shape and arrangement of parts may be resorted to without departing from the spirit of the invention or the scope of the subjoined claims.

Having thus described my invention, I claim:

1. An end piece connection for an ophthalmic mounting, comprising separable end piece members and a temple end connection, said end piece members having a plurality of aligned openings and a recess for the temple end, the temple end having an opening aligned with one pair of openings in the end piece members, a boss fixed to the temple end and projecting from the opening therein and extending into one of the openings in the end piece members, a pin fixed in the opposed opening in the end piece members extending into the opening in the temple end and boss, and means in the other openings in the end piece members to hold the members together.

2. An end piece connection for an ophthalmic mounting, comprising separable end piece members and a temple end connection, said end piece members having a plurality of aligned openings and a recess for the temple end, the temple end having an opening aligned with one pair of openings in the end piece members, and a tube fixedly secured in the opening therein and projecting therebeyond on one side into one of the openings in the end piece members, a pin fixed in the opposed opening in the end piece members extending into the tube, and means in the other openings in the end piece members to hold the members together.

3. An end piece connection for an ophthalmic mounting, comprising separable end piece members and a temple connection, said end piece members having aligned openings and a recess for the temple end, the temple end having an opening aligned with the openings in the end piece members, a boss fixed to the temple end and projecting from the opening therein and extending into one of the openings in the end piece members, and a pin fixed in the opposed opening in the end piece members, extending into the opening in the temple end and the boss.

4. An end piece connection for an ophthalmic mounting, comprising separable end piece members and a temple connection, said end piece members having aligned openings and a recess for the temple end, the temple end having an opening aligned with the openings in the end piece members, a tube fixed in and projecting from the opening in the temple end and winding into one of the openings in the end piece member, and a pin fixed in the opposed opening in the end piece members extending into the tube in the temple end.

LAWRENCE POETON.